May 31, 1966 R. D. AUNGST 3,254,270
CAPACITOR ASSEMBLY
Filed Oct. 2, 1962 2 Sheets-Sheet 1

WITNESSES
John C. Heasley, Jr.
James T. Young

INVENTOR
Robert D. Aungst
BY
ATTORNEY

United States Patent Office 3,254,270
Patented May 31, 1966

3,254,270
CAPACITOR ASSEMBLY
Robert D. Aungst, Bloomington, Ind., assignor to Westinghouse Electric Corporation, Pittsburgh, Pa., a corporation of Pennsylvania
Filed Oct. 2, 1962, Ser. No. 227,842
9 Claims. (Cl. 317—99)

The present invention relates to capacitor assemblies, and more particularly to a self-contained capacitor bank or assembly for mounting on a utility pole.

Shunt capacitor banks are widely used on distribution lines for improving the power factor, and in many cases such capacitor banks are mounted on poles near a load center or at other locations where the power factor correction will be most effective. Self-contained pre-assembled capacitor banks or assemblies are very desirable for this purpose and are frequently used. Heretofore these pole-mounted capacitor assemblies have utilized a heavy rectangular metal frame or rack in which the capacitor units were supported in vertical positon. These frames were necessarily relatively long in order to accommodate as many as twelve or more standard capacitors of fifty or one hundred KVAR rating, for example. These assemblies therefore were bulky and heavy, and imposed large bending moments on the pole on which they were mounted. Switches and other necessary or desirable accessory devices have had to be mounted at the rear of the rack or separately mounted above it in inconvenient and undesirable locations. Thus these prior assemblies were inconvenient and difficult to install and had many disadvantages.

The principal object of the present invention is to provide a self-contained, low cost, easily handled capacitor assembly for mounting on a pole.

Another object of the invention is to provide a capacitor assembly for pole mounting which has a simple, light-weight frame structure arranged to minimize or eliminate any bending moments on the pole, and to have no live parts or other elements extending from the rear of the assembly.

A further object of the invention is to provide a capacitor assembly for pole mounting in which the capacitors are supported horizontally for the most effective heat dissipation and electrical characteristics, and which provides convenient mounting for switches and other accessory devices.

Other objects and advantages of the invention will be apparent from the following detailed description of a preferred embodiment, taken in connection with the accompanying drawing, in which.

Figure 1:
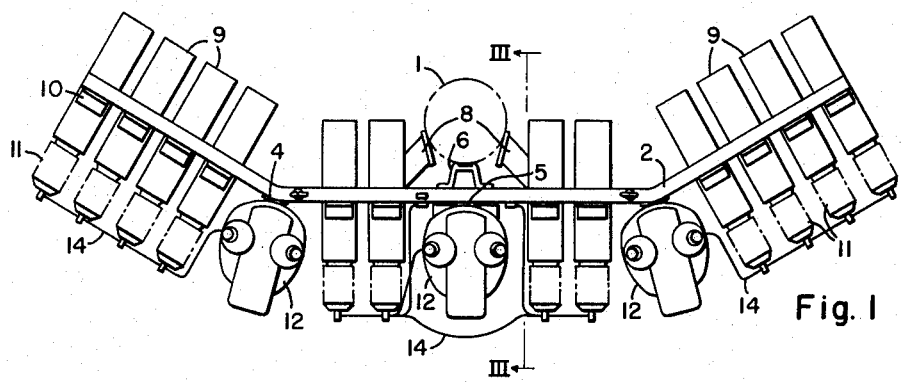
FIGURE 1 is a plan view of a capacitor assembly embodying the invention.
Figure 4:
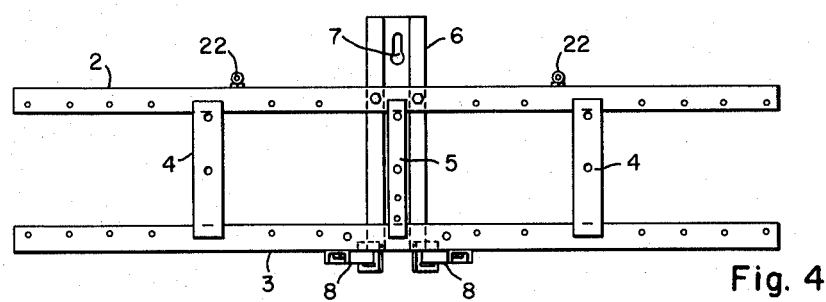
FIG. 4 is a front elevation of a frame structure.

The drawing shows a capacitor bank or assembly adapted to be mounted on a pole indicated at 1 for connection to a distribution line. The assembly includes a frame structure which supports the capacitor units and associated devices and which is mounted directly on the pole. The frame structure consists of two rigid frame members 2 and 3 which are preferably made of aluminum for light weight and which are shown as being channel members. The two frame members 2 and 3 are vertically spaced apart and extend parallel to each other. As shown in FIG. 1, the frame members are bent at two points so that each consists of a central portion and two end portions which extend back from the central portion at an angle thereto. Vertical tie members 4 are secured to the upper and lower frame members 2 and 3 at the points where the end portions are bent back from the central portion, and a third tie member 5 is preferably secured between the frame members 2 and 3 at the center of the central portion. The tie members 4 and 5 are welded, or otherwise rigidly secured, to the frame members 2 and 3 to hold them together in parallel, vertically spaced relation, thus forming a strong, rigid and light weight frame structure, as seen in FIG. 4. If desired or necessary, additional vertical tie members might be provided at suitable points, such as at the ends of the frame members. A channel member 6, or other suitable mounting member, is secured to the rear of the central portion of the frame structure and may be provided with holes 7 for receiving bolts for mounting the assembly on the pole 1. Brace members 8 may be secured to the bottom of the assembly, if desired, to engage the pole and prevent rotation of the assembly about the pole. The mounting member 6 and brace members 8 may be of any suitable or desired type to facilitate securely mounting the assembly on the pole 1.

Figure 2:
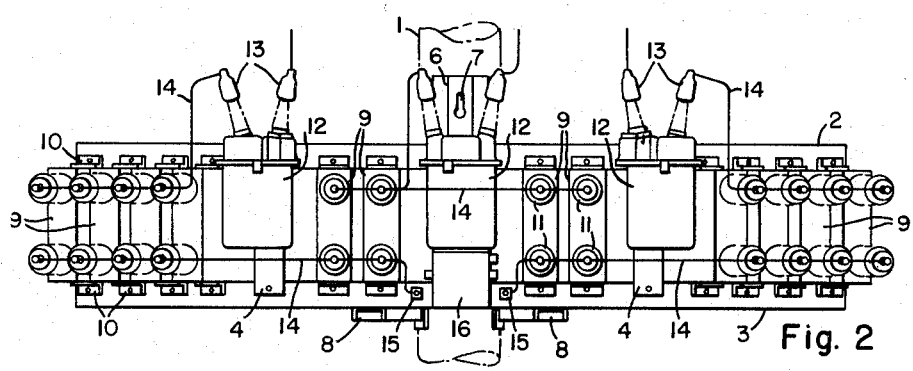
FIG. 2 is a front elevation view of the assembly of FIG. 1.
Figure 3:
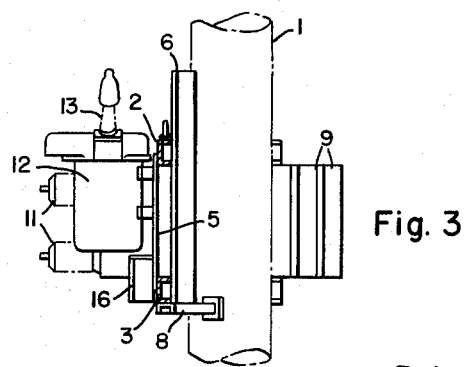
FIG. 3 is a transverse view substantially on the line III—III of FIG. 1.

A plurality of capacitors 9 are mounted in the frame structure. In the illustrated embodiment, there are twelve capacitors disposed in three groups of four each to form a three-phase capacitor bank, although it will be understood that any desired number or arrangement of capacitors may be used. As shown in FIGS. 1 and 2, the capacitors 9 are standard power capacitor units and are mounted in horizontal position between the frame members 2 and 3. Standard capacitors are provided with mounting brackets 10 at each end, and the brackets 10 engage the frame members 2 and 3 and are bolted or otherwise securely attached to the frame members. The capacitors 9 are thus disposed in horizontal position with their terminal bushings 11 extending horizontally at the front of the assembly. A group of capacitors is mounted in each of the end portions of the frame structure, and the third group of capacitors is mounted in the central portion, with the capacitors of the last mentioned group spaced apart in the center on opposite sides of the central tie member 5.

It is usually necessary to provide switch means for connecting the capacitor bank to the line and for switching it on and off. For this purpose three switches 12 are provided. The switches 12 may be any suitable type of switch, such as oil switches, and have vertically extending terminal bushings 13. The angular relation of the central portion and end portions of the frame structure provides spaces between the groups of capacitors, and two of the switches 12 are placed in these spaces where the central portion and end portions of the frame structure join, and are mounted on the vertical tie members 4. The third switch 12 is mounted on the central tie member 5 in the space provided at the center of the third group of capacitors in the central portion of the frame. Thus, the tie members 4 and 5 not only form part of the frame structure but provide convenient and desirable mounting positions for the necessary switches.

The capacitors 9 may be connected electrically in any desired manner. In the illustrated embodiment, the capacitors of each group are connected together in parallel by conductors 14 to form one phase of a three-phase, Y-connected capacitor bank. Each of the phase groups in the end portions of the frame is connected to the adjacent switch 12, and the phase group in the central portion of the frame is connected to the switch 12 in the center of the assembly. The lower terminals of all the capacitors are connected together and to terminal studs 15 on the lower frame member 3 which provides the neutral point of the Y-connected bank. It will be obvious that any other desired electrical connection might be used. A junction box 16 is preferably mounted on the central tie member 5 below the switch 12 for connecting the necessary control wiring for operation of the switches 12. The control wiring has been omitted to simplify the drawing and it will be understood that the switches may be either manually or automatically controlled in any desired manner.

It will be apparent that this capacitor assembly has many advantages. The frame structure has been reduced to a minimum number of parts, and can be produced with a minimum amount of welding, so that a light weight and low cost structure is provided but one which is very strong and rigid. The arrangement of the frame structure with the two end portions bent back from the central portion is such that the complete assembly can be designed with its center of gravity close to, or even coinciding with, the axis of the pole 1 so that bending moments on the pole are minimized or can be substantially eliminated. This is a very important advantage because of the weight of a substantial number of capacitors with the necessary switches, which has caused excessive bending moments on the pole with prior constructions.

The horizontal mounting of the capacitors also has many advantages. In this position, the capacitors are arranged for the best possible heat dissipation, while the horizontal position of the terminal bushings provides improved self-cleaning action and more uniform distribution of voltage stress, as well as putting the wiring away from the pole itself for increased safety. The arrangement of the frame structure inherently provides large spacing between the three-phase groups, so that adequate electrical clearance is automatically obtained, and the spacing between phase groups also provides convenient and desirable locations for the switches as previously indicated. The position of the switches with their terminal bushings 13 extending vertically above the frame structure permits short and direct connections to the line with no adjacent live or grounded parts.

Figure 5:
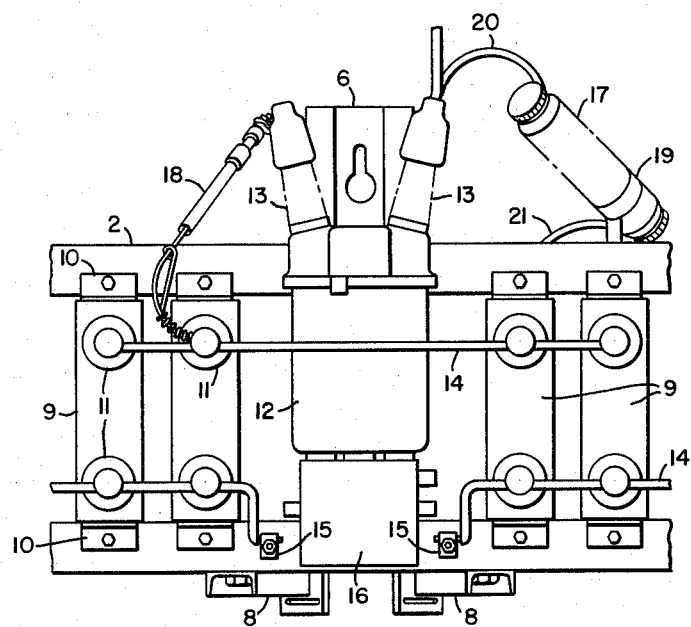
FIG. 5 is a fragmentary view of the central portion of an assembly similar to that of FIG. 1 showing the mounting of certain protective devices.

It is frequently desirable to provide certain accessory devices, such as the junction box mentioned above, and the present construction makes it easily possible to mount such devices directly on the capacitor assembly itself, thus simplifying installation and avoiding the necessity of separately installing accessory devices in the limited space available on a utility pole. This is illustrated in FIG. 5, which shows the central portion only of the capacitor assembly of FIG. 1 and the mounting of a lightning arrester 17 and a fuse 18 for the phase group in the central portion of the frame structure. The arrester 17 may be of any suitable type and is shown as a valve type arrester supported in a mounting bracket 19 attached to the upper frame member 2. The line lead 20 of the arrester is connected to the adjacent terminal bushing 13 of the switch 12 and the ground lead 21 may be connected to ground either directly or through the frame structure. The fuse 18 may be an expulsion fuse or it may be of any other suitable type for disconnecting the phase group in case of failure of one of the capacitors 9 or other overcurrent condition. The fuse 18 is mounted at one end directly on the terminal bushing 13 of the switch 12 and its other end is connected to a terminal bushing 11 of one of the capacitors 9, so that the fuse is in series with the parallel group of capacitors. It will be understood that similar arresters and fuses, similarly mounted and connected, are provided for each of the other two groups of capacitors in the assembly. It will be seen that the addition of the arresters and fuses makes the assembly a completely self-protected and self-contained capacitor bank which can be mounted directly on the pole as a unit and directly connected to the line, thus making a very simple installation. The frame structure and the location of the switches are such that these accessory protective devices can be readily mounted in the manner shown and in the most desirable positions with respect to the assembly.

It will be evident that a capacitor assembly has been described which has many important advantages. As previously described, the assembly is such that it imposes minimum bending moments on the pole 1 and has maximum heat dissipating ability for the capacitors as well as improved electrical characteristics. In addition to these advantages, it will be seen that the arrangement is such that no live parts extend from the rear of the assembly and that there are no projecting or extending parts in the vicinity of the pole 1. Thus the entire space at the rear of the assembly is clear and adequate space is provided to enable a lineman to climb the pole without obstruction from the capacitor bank and without approaching any live parts, thus improving the safety of the installation as compared to the conditions existing with previous types of pole-mounted capacitor assemblies.

The entire assembly is very compact and light in weight and can be easily handled. The assembly can rest on a floor without damage to the capacitors, since it rests on the lower frame member 3, and thus no unusual or special precautions are necessary during storage or shipment. The assembly is well balanced and can easily be lifted for installation by means of lifting lugs or eyes 22 which may be attached at any convenient points on the upper frame member 2. Thus installation is very easy since the complete assembly can readily be mounted on the pole and connected to the line with a minimum number of operations. It will be noted that the capacitor units, switches and other accessory devices are easily accessible either from the pole itself from the rear of the assembly, or from an elevated basket crane such as is frequently used for line work. At the same time, the rear of the assembly is free of live parts and an unobstructed climb space is provided as mentioned above.

It will now be apparent that a self-contained pole-mounted capacitor assembly has been provided which has many advantages. A preferred embodiment of the invention has been shown and described for the purpose of illustration, but it will be apparent that various modifications and other embodiments of the invention are possible, and all such embodiments and modifications are within the scope of the invention.

I claim as my invention:

1. A capacitor assembly comprising a frame structure having a central portion and two end portions, each of the end portions extending back from the central portion at an angle thereto, groups of capacitors supported in the central portion and each of the end portions of the frame structure, switch means for one group of capacitors mounted on the central portion of the frame structure, and switch means for each of the other two groups of capacitors mounted on the frame structure in the spaces between groups of capacitors at the junctions between the central portion and the end portions of the frame structure.

2. A capacitor assembly comprising a frame structure having a central portion and two end portions, each of the end portions extending back from the central portion at an angle thereto, groups of capacitors supported in the central portion and each of the end portions of the frame structure, switch means for one group of capacitors mounted on the central portion of the frame structure, switch means for each of the other two groups of capacitors mounted on the frame structure in the spaces between groups of capacitors at the junctions between the central portion and the end portions of the frame structure, and protective devices on the frame structure for each group of capacitors.

3. A capacitor assembly including a frame structure comprising two vertically spaced, parallel frame members, said frame members having end portions extending back from the central portions at an angle thereto, and a plurality of capacitors supported in horizontal position between the frame members and attached to the frame members to be supported thereby.

4. A capacitor assembly including a frame structure comprising two vertically spaced, parallel frame members, said frame members having end portions extending back from the central portions at an angle thereto, vertical tie members extending between the frame members, a plurality of capacitors supported in horizontal position between the frame members and attached to the frame members to be supported thereby, and switch means for the capacitors mounted on said tie members.

5. A capacitor assembly including a frame structure comprising two vertically spaced, parallel frame members, said frame members having end portions extending back from the central portions at an angle thereto, vertical tie members extending between the frame members at the points where the end portions of the frame members to join the central portion, a vertical tie member extending between the frame members at the center of the central portions, a plurality of capacitors supported in horizontal position between the frame members and attached to the frame members to be supported thereby, and switch means for the capacitors mounted on said tie members.

6. A capacitor assembly including a frame structure comprising two vertically spaced, parallel frame members, said frame members having end portions extending back from the central portions at an angle thereto, vertical tie members extending between the frame members at the points where the end portions of the frame members join the central portions, a vertical tie member extending between the frame members at the center of the central portions, groups of capacitors supported in horizontal position between the central portions of the frame members and between the end portions of the frame members at each side of the central portion said capacitors being attached to the frame members to be supported thereby, and switch means mounted on each of said tie members and connected to one of said groups of capacitors.

7. A capacitor assembly including a frame structure comprising two vertically spaced, parallel frame members, said frame members having end portions extending back from the central portions at an angle thereto, vertical tie members extending between the frame members at the points where the end portions of the frame members join the central portion, a vertical tie member extending between the frame members at the center of the central portions, groups of capacitors supported in horizontal position between the central portions of the frame members and between the end portions of the frame members at each side of the central portion said capacitors being attached to the frame members to be supported thereby, switch means mounted on each of said tie members and connected to one of said groups of capacitors, and protective means on the frame structure for each group of capacitors.

8. A capacitor assembly comprising a frame structure having two vertically spaced, parallel frame members, tie members extending vertically between the frame members, and a plurality of capacitors, said capacitors being generally rectangular and having terminal bushings at one end thereof, the capacitors being disposed between said frame members in horizontal position with the terminal bushings extending horizontally, and the capacitors being attached to the frame members to be supported thereby.

9. A capacitor assembly comprising a frame structure having two vertically spaced, parallel frame members, said frame members having a central portion and two end portions extending back from the central portion at an angle thereto, tie members extending vertically between the frame members, and a plurality of capacitors, said capacitors being generally rectangular and having terminal bushings at one end thereof, the capacitors being disposed between said frame members in horizontal position with the terminal bushings extending horizontally, and the capacitors being attached to the frame members to be supported thereby.

References Cited by the Examiner

UNITED STATES PATENTS

| | | | |
|---|---|---|---|
| 1,867,394 | 7/1932 | Acly | 248—221 |
| 2,990,151 | 6/1961 | Phillips | 248—221 |

KATHLEEN H. CLAFFY, *Primary Examiner.*

JOHN F. BURNS, J. G. COBB, *Assistant Examiners.*